United States Patent
Zhou et al.

(10) Patent No.: US 10,462,379 B2
(45) Date of Patent: Oct. 29, 2019

(54) DRIVING METHOD FOR HIGH DYNAMIC RANGE DISPLAY SCREEN, DRIVING APPARATUS AND DISPLAY SCREEN

(71) Applicants: BOE TECHNOLOGY GROUP CO., LTD., Beijing (CN); BEIJING BOE DISPLAY TECHNOLOGY CO., LTD., Beijing (CN)

(72) Inventors: Chengqi Zhou, Beijing (CN); Yifang Chu, Beijing (CN); Shou Li, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 144 days.

(21) Appl. No.: 15/548,863

(22) PCT Filed: Feb. 6, 2017

(86) PCT No.: PCT/CN2017/072986
§ 371 (c)(1),
(2) Date: Aug. 4, 2017

(87) PCT Pub. No.: WO2017/190539
PCT Pub. Date: Nov. 9, 2017

(65) Prior Publication Data
US 2018/0069999 A1    Mar. 8, 2018

(30) Foreign Application Priority Data
May 6, 2016    (CN) .......................... 2016 1 0298897

(51) Int. Cl.
*G09G 3/34* (2006.01)
*H04N 5/235* (2006.01)
(Continued)

(52) U.S. Cl.
CPC ......... *H04N 5/2355* (2013.01); *G06T 1/0007* (2013.01); *G06T 5/008* (2013.01);
(Continued)

(58) Field of Classification Search
CPC ....... H04N 5/2355; G06T 7/11; G06T 1/0007; G06T 5/008; G06T 2207/20012;
(Continued)

(56) References Cited

U.S. PATENT DOCUMENTS

2003/0016204 A1    1/2003    Lee
2010/0295879 A1*  11/2010    Tanaka ................. G09G 3/3426
                                                    345/690
(Continued)

FOREIGN PATENT DOCUMENTS

CN    1932615 A       3/2007
CN    101673521 A     3/2010
(Continued)

OTHER PUBLICATIONS

The First Chinese Office Action dated Oct. 23, 2017; Appln. 201610298897.X.
(Continued)

*Primary Examiner* — Lixi C Simpson

(57) ABSTRACT

A driving method and a driving apparatus of a high dynamic range display screen, and a display screen. The driving method includes: acquiring image data to be displayed; determining a local backlight brightness of each region in a backlight module according to the image data to be displayed; adjusting pixel brightness corresponding to the image data to be displayed according to the local backlight brightness and a maximum backlight bright in the backlight module; and carrying out display according to the adjusted brightness and the determined local backlight brightness of each region.

12 Claims, 3 Drawing Sheets

(51) Int. Cl.
  *G06T 5/00* (2006.01)
  *G06T 7/11* (2017.01)
  *G06T 1/00* (2006.01)
(52) U.S. Cl.
  CPC .............. *G06T 7/11* (2017.01); *G09G 3/3406* (2013.01); *G09G 3/3426* (2013.01); *G06T 2207/20012* (2013.01); *G06T 2207/20208* (2013.01); *G09G 2320/0646* (2013.01); *G09G 2360/16* (2013.01)
(58) Field of Classification Search
  CPC ........ G06T 2207/20208; G09G 3/3406; G09G 3/3426; G09G 2320/0646; G09G 2360/16
  See application file for complete search history.

(56) References Cited

U.S. PATENT DOCUMENTS

| | | | |
|---|---|---|---|
| 2011/0141090 A1 | 6/2011 | Hong et al. | |
| 2011/0141155 A1 | 6/2011 | Hong et al. | |
| 2011/0148941 A1* | 6/2011 | Kim | G09G 3/3426 345/690 |
| 2012/0105509 A1* | 5/2012 | Ito | G02F 1/133603 345/690 |
| 2012/0139974 A1* | 6/2012 | Sakai | G09G 3/3426 345/690 |
| 2012/0154459 A1* | 6/2012 | Otoi | G09G 3/3426 345/690 |
| 2014/0225943 A1* | 8/2014 | Shiobara | G09G 3/3413 345/694 |
| 2017/0061902 A1 | 3/2017 | Zhang et al. | |

FOREIGN PATENT DOCUMENTS

| | | |
|---|---|---|
| CN | 101707051 A | 5/2010 |
| CN | 102097071 A | 6/2011 |
| CN | 102098830 A | 6/2011 |
| CN | 102103840 A | 6/2011 |
| CN | 102243855 A | 11/2011 |
| CN | 105185328 A | 12/2015 |
| CN | 105741789 A | 7/2016 |
| JP | 2000-293142 A | 10/2000 |

OTHER PUBLICATIONS

International Search Report and Written Opinion dated Apr. 28, 2017; PCT/CN2017/072986.

* cited by examiner

DRIVING METHOD FOR HIGH DYNAMIC RANGE DISPLAY SCREEN, DRIVING APPARATUS AND DISPLAY SCREEN

TECHNICAL FIELD

Embodiments of the present disclosure relate to a driving method and a driving apparatus for a high dynamic range display screen, and a display screen.

BACKGROUND

Currently, liquid crystal display screens are used more and more widely, and how to reduce power consumption of the liquid crystal display screens has attracted more and more attention. A backlight module in a liquid crystal display screen is a part with the highest energy consumption, and thus, by reducing power consumption of the backlight module, overall power consumption of the liquid crystal display screen can be greatly reduced.

SUMMARY

For example, embodiments of the disclosure provide a driving method of a high dynamic range display screen, comprising: acquiring image data to be displayed; determining a local backlight brightness of each region in a backlight module according to the image data to be displayed; adjusting pixel brightness corresponding to the image data to be displayed according to the local backlight brightness and a maximum backlight bright in the backlight module; and carrying out display according to the adjusted brightness and the determined local backlight brightness of each region.

For example, in the driving method provided by the embodiments, the adjusting the brightness of the image data to be displayed according to the local backlight brightness and the maximum backlight brightness in the backlight module includes: determining original pixel brightness according to the image data to be displayed; and adjusting the original pixel brightness according to the local backlight brightness and the maximum backlight brightness in the backlight module.

For example, in the driving method provided by the embodiments, the adjusting the original pixel brightness according to the local backlight brightness and the maximum backlight brightness in the backlight module includes: adjusting the original pixel brightness by adopting a formula as follows:

$$Y = Y_0 + \frac{(BL_{max} - BL_{DB}) \times Y_0}{BL_{max} \times a},$$

where Y0 is the original pixel brightness, Y is the adjusted pixel brightness, BLMAX is a maximum backlight brightness in the backlight module, BLDB is the local backlight brightness of the backlight module, and "a" is an adjustable parameter.

For example, in the driving method provided by the embodiments, the BLDB is a local backlight brightness of the backlight module after dynamic adjustment.

For example, in the driving method provided by the embodiments, a value of the "a" parameter ranges from ⅛ to 1.

For example, in the driving method provided by the embodiments, when brightness of a region which corresponds to the image data to be displayed is smaller, the determined local backlight brightness in the backlight module is smaller.

Embodiments of the disclosure further provide a driving apparatus of a high dynamic range display screen, comprising: a receiving unit, configured to acquire image data to be displayed; a backlight control unit, configured to determine a local backlight brightness of each region in a backlight module according to the image data to be displayed; a pixel compensation unit, configured to adjust brightness corresponding to the image data to be displayed according to the local backlight brightness and a maximum backlight brightness in the backlight module; and a display control unit, configured to carry out display according to the adjusted brightness and the determined local backlight brightness of each region.

For example, in the driving apparatus provided by the embodiments, the pixel compensation unit is configured to: determine original pixel brightness according to the image data to be displayed; and adjust the original pixel brightness according to the local backlight brightness and the maximum backlight brightness in the backlight module.

For example, in the driving apparatus provided by the embodiments, the pixel compensation unit is configured to adjust the original pixel brightness by adopting a formula as follows:

$$Y = Y_0 + \frac{(BL_{max} - BL_{DB}) \times Y_0}{BL_{max} \times a},$$

where Y0 is the original pixel brightness, Y is the adjusted pixel brightness, BLMAX is the maximum backlight brightness in the backlight module, BLDB is the local backlight brightness of the backlight module, and "a" is an adjustable parameter.

For example, in the driving apparatus provided by the embodiments, the BLDB is a local backlight brightness of the backlight module after dynamic adjustment.

For example, in the driving apparatus provided by the embodiments, a value of the "a" parameter ranges from ⅛ to 1.

For example, in the driving apparatus provided by the embodiments, when brightness of a region which corresponds to the image data to be displayed is smaller, the determined local backlight brightness in the backlight module is smaller.

Embodiments of the disclosure further provide a high dynamic range display screen, comprising a backlight module and the driving apparatus provided by any embodiment of the disclosure.

BRIEF DESCRIPTION OF THE DRAWINGS

In order to illustrate the technical solutions in the embodiments of the present disclosure more clearly, the drawings used in the description of the embodiments will be briefly described in the following; it is obvious that the drawings described below are only related to some embodiments of the present disclosure, and not intended to be restrictive to the disclosure.

DETAILED DESCRIPTION

Figure 1:
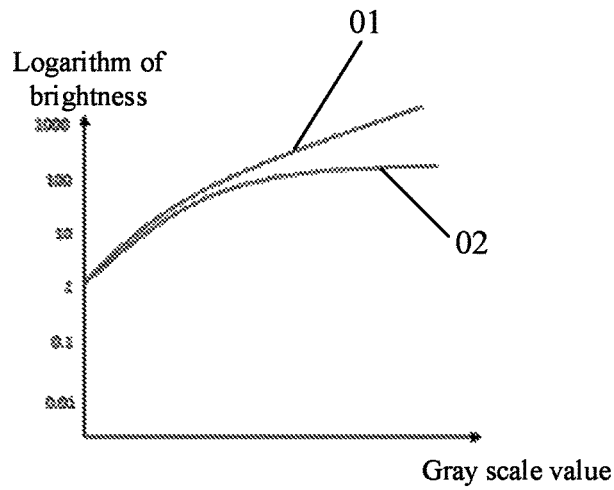
FIG. 1 is a schematic diagram illustrating a relationship between an electro-optical conversion function curve after data compensation is carried out and an electro-optical conversion function curve when data compensation is not carried out when an existing approach is used.

In order to illustrate the purposes, technical solutions and advantages in the embodiments of the present disclosure more clearly, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

Unless otherwise clearly defined and limited, technical terms or scientific terms used in the disclosure should have ordinary meanings understood by persons having ordinary skills in the field of the disclosure. Terms such as "a," "an," or "the" etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. Terms such as "installed", "coupled", "connected" should not be limited to physically or mechanically connected, and may include electrical connection, regardless of being directly or indirectly connected.

Specific implementations of a driving method and a driving apparatus for a high dynamic range display screen, which are provided by embodiments of the present disclosure, will be illustrated in details in connection with the drawings.

For example, a backlight module adopting a direct-lit type Light-Emitting Diode (LED) backlight combined with a Local Dimming technology can greatly reduce power consumption of the backlight module, improve contrast and gray scale values of display images and reduce ghost shadow.

For example, the backlight module combined with the Local Dimming technology utilizes a backlight source including hundreds of LEDs to replace a Cold Cathode Fluorescent Lamp (CCFL) backlight. Each LED constituting the backlight module can be adjusted according to brightness of an image. An LED corresponding to a high brightness portion in the display image can be adjusted to reach a maximum brightness, and meanwhile, an LED corresponding to a dark portion in the display image can be correspondingly reduced in brightness and even turned off so as to reach an optimal contrast. Therefore, in the backlight module, overall power consumption of the backlight module is reduced by reducing brightness of dark regions.

For example, when the backlight module adopts the Local Dimming technology to carry out the adjustment, in order to keep original display brightness to be changed relatively not much, pixel data may be compensated generally, and a formula as follows can be adopted to carry out the compensation:

$$R_{DB} = \frac{R}{\sqrt[22]{\frac{BL_{DB}}{BL}}},$$

where BL is standard backlight brightness, $BL_{DB}$ is a local backlight brightness after dynamic adjustment, R is original pixel data, and $R_{SB}$ is pixel data after data compensation. As shown in FIG. 1, by comparing an electro-optical conversion function curve 01 after data compensation is carried out by adopting the above formula with an electro-optical conversion function curve 02 when data compensation is not carried out, it can be seen that a minimum brightness after data compensation is relatively high so as to generate a certain influence on a display contrast, and thus, when being applied to a high dynamic range (HDR) display screen with a strict requirement for the contrast, a contrast standard of the HDR display screen cannot be satisfied.

Figure 2:
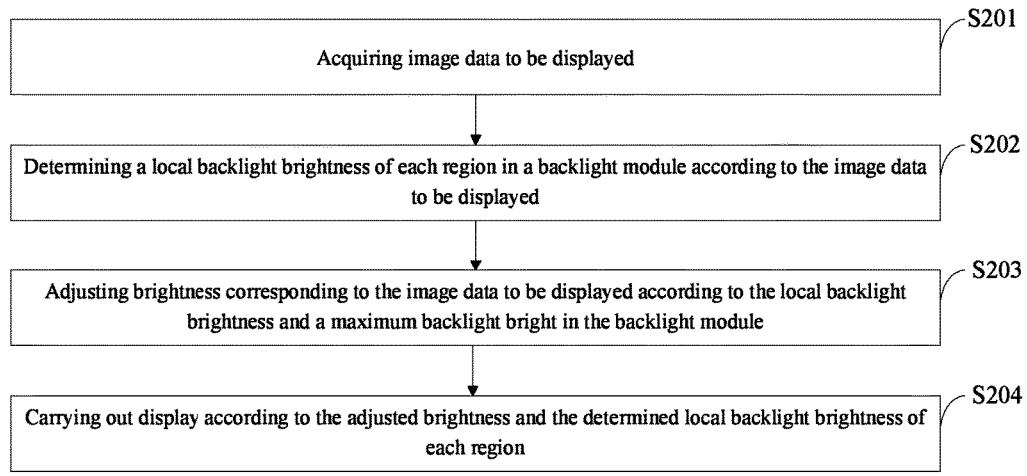
FIG. 2 is a flow chart of a driving method for a high dynamic range display screen provided by an embodiment of the present disclosure.
Figure 3:
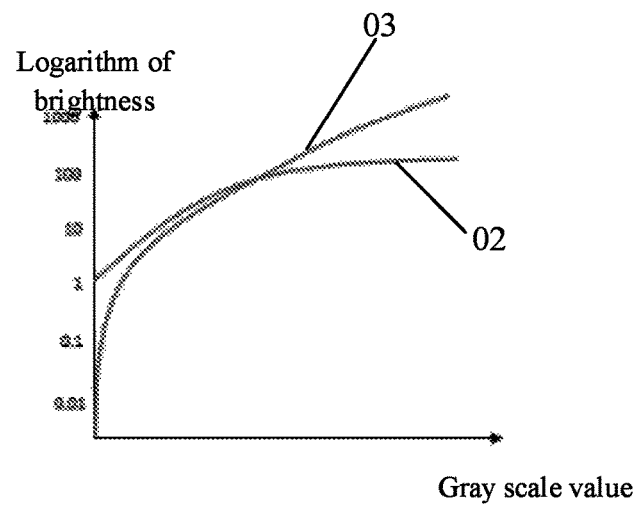
FIG. 3 is a schematic diagram illustrating a relationship between an electro-optical conversion function curve after data compensation is carried out and an electro-optical conversion function curve when data compensation is not carried out when an approach provided by an embodiment of the present disclosure is used.

A driving method for a high dynamic range display screen, which is provided by an embodiment of the present disclosure, as shown in FIG. 2, includes:

S201: acquiring image data to be displayed;

S202: determining a local backlight brightness of each region in a backlight module according to the image data to be displayed;

S203: adjusting brightness corresponding to the image data to be displayed according to the local backlight brightness and a maximum backlight bright in the backlight module; and S204: carrying out display according to the adjusted brightness and the determined local backlight brightness of each region.

For example, according to the driving method and the driving apparatus for the high dynamic range display screen, which are provided by embodiments of the present disclosure, after the image data to be displayed is acquired (for example, received), the local backlight brightness of each region in the backlight module is determined according to the image data to be displayed (e.g., the brightness corresponding to the display image data). Then, the brightness of the image data to be displayed is adjusted according to the local backlight brightness and the maximum backlight brightness in the backlight module, so as to guarantee a minimum brightness value after adjustment (e.g., data compensation) to be relatively low and meet a contrast standard of the HDR display screen. Finally, display is carried out according to the adjusted brightness and the determined local backlight brightness of each region in the backlight module.

For example, in the driving method for the high dynamic range display screen, which is provided by embodiments of the present disclosure, in the step S202 of determining the local backlight brightness of each region in the backlight module according to the image data to be displayed, the local dimming technology can be adopted to carry out adjustment on the local backlight brightness of each region in the backlight module. For example, the smaller the brightness of a region in the image data to be displayed is, the smaller the corresponding local backlight brightness in the backlight module is, so that brightness of dark regions can be reduced in the backlight module, thereby reducing overall power consumption of backlight.

For example, in the driving method for the high dynamic range display screen, which is provided by embodiments of the present disclosure, the step S203 of adjusting the brightness of the image data to be displayed according to the local backlight brightness and the maximum backlight bright in the backlight module may be implemented in the following way:

firstly, determining original pixel brightness according to the image data to be displayed; and then, adjusting the original pixel brightness according to the local backlight brightness and the maximum backlight brightness in the backlight module.

For example, when the original pixel brightness is adjusted according to the local backlight brightness and the maximum backlight brightness in the backlight module, the original pixel brightness can be adjusted by adopting a formula as follows:

$$Y = Y_0 + \frac{(BL_{max} - BL_{DB}) \times Y_0}{BL_{max} \times a};$$

where $Y_0$ is the original pixel brightness, Y is the adjusted pixel brightness, $BL_{MAX}$ is the maximum backlight brightness in the backlight module, $BL_{DB}$ is the local backlight brightness of the backlight module, and "a" is an adjustable parameter.

For example, the $BL_{DB}$ is a local backlight brightness of the backlight module after dynamic adjustment.

For example, a value of the "a" parameter in the formula ranges from 1/8 to 1.

For example, it can be seen that an electro-optical conversion function curve 03 of the pixel brightness after adjustment is carried out by adopting the above formula has a relatively low minimum brightness, when comparing with the electro-optical conversion function curve 02 when data compensation is not carried out. Thus, the contrast standard of the HDR display screen can be satisfied.

For example, based on the same inventive concept, an embodiment of the present disclosure further provides a driving apparatus for a high dynamic range display screen. A problem-solving principle of the apparatus is similar with that of the above-mentioned driving method for the high dynamic range display screen, and thus, implementation of the apparatus can be achieved with reference to implementation of the method. Similar description will not be repeated here.

Figure 4:
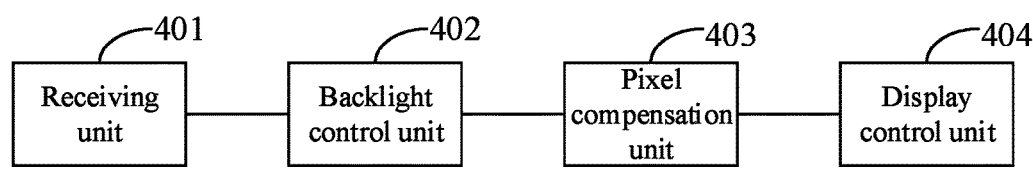
FIG. 4 is a schematic diagram of a driving apparatus for a high dynamic range display screen provided by an embodiment of the present disclosure.

The driving apparatus for the high dynamic range display screen, which is provided by embodiments of the present disclosure, as shown in FIG. 4, includes:

a receiving unit 401, configured for acquiring image data to be displayed;

a backlight control unit 402, configured for determining a local backlight brightness of each region in a backlight module according to the image data to be displayed;

a pixel compensation unit 403, configured for adjusting brightness of the image data to be displayed according to the local backlight brightness and the maximum backlight brightness in the backlight module; and a display control unit 404, configured for carrying out display according to the adjusted brightness and the determined local backlight brightness of each region in the backlight module.

For example, in embodiments of the present disclosure, the receiving unit 401, the backlight control unit 402, the pixel compensation unit 403 and the display control unit 404 may be implemented by a circuit (e.g., an integrated circuit).

For example, in the driving apparatus provided by embodiments of the present disclosure, the pixel compensation unit 403 is configured for: determining original pixel brightness according to the image data to be displayed; and adjusting the original pixel brightness according to the local backlight brightness and the maximum backlight brightness in the backlight module.

For example, in the driving apparatus provided by embodiments of the present disclosure, the pixel compensation unit 403 adopts a formula as follows to adjust the original pixel brightness:

$$Y = Y_0 + \frac{(BL_{max} - BL_{DB}) \times Y_0}{BL_{max} \times a},$$

where $Y_0$ is the original pixel brightness, Y is the adjusted pixel brightness, $BL_{MAX}$ is the maximum backlight brightness of the backlight module, $BL_{DB}$ is the local backlight brightness of the backlight module, and "a" is an adjustable parameter.

For example, the $BL_{DB}$ is a local backlight brightness of the backlight module after dynamic adjustment.

For example, in the driving apparatus provided by embodiments of the present disclosure, a value of the "a" parameter in the pixel compensation unit 403 ranges from 1/8 to 1.

For example, in the driving apparatus provided by embodiments of the present disclosure, when brightness of a region which corresponds to image data to be displayed is smaller, the determined local backlight brightness in the backlight module is smaller.

For example, by description on the above implementation approaches, those skilled in the art can clearly know that each unit (e.g., the receiving unit 401, the backlight control unit 402, the pixel compensation unit 403 and the display control unit 404) in embodiments of the present disclosure can be implemented by hardware (e.g., in ways of the integrated circuit, a Field Programmable Gate Array (FPGA) and the like), and can also be implemented in a way of software plus a universal hardware platform. Based on such understanding, the technical solutions of the embodiments of the present disclosure may be shown in a form of a software product, and the software product may be stored in a nonvolatile storage medium (which may be a Compact Disc Read-Only Memory (CD-ROM), a U disk, a mobile hard disk and the like), and includes a plurality of instructions for enabling a computer device (which may be a personal computer, a server, or a network device and the like) to execute the methods according to respective embodiments of the present disclosure.

Figure 5:
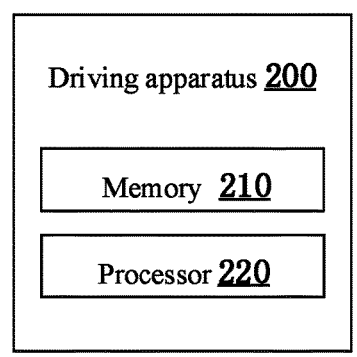
FIG. 5 is a schematic diagram of a driving apparatus provided by an embodiment of the present disclosure.

For example, as shown in FIG. 5, the driving apparatus 200 can include a memory 210 and a processor 220. In some embodiments, the driving apparatus may include one or more processors and one or more memories.

For example, the memory 210 and the processor 220 can implement functions of respective units (e.g., the receiving unit 401, the backlight control unit 402, the pixel compensation unit 403 and the display control unit 404) in the driving apparatus 200.

In embodiments of the present disclosure, the processor can process a data signal, and can include various computation structures, e.g., a Complex Instruction Set Computer (CISC) structure, a Reduced Instruction Set Computer (RISC) structure or a structure which implements combination of various instruction sets. In some embodiments, the processor may also be a microprocessor, e.g., an X86 processor or an ARM processor, or may be a Digital Signal Processor (DSP) and the like. The processor can control other components to execute desired functions.

In embodiments of the present disclosure, the memory can store instructions and/or data executed by the processor. For example, the memory may include one or more computer program products, and each computer program product may include various forms of computer readable storage media, e.g., a volatile memory and/or a nonvolatile memory and the like. The volatile memory, for example, may include a Random Access Memory (RAM) and/or a cache and the like. The nonvolatile memory, for example, may include a Read Only Memory (ROM), a hard disk, a flash memory and the like. One or more computer program instructions may be stored on the computer readable storage medium, and the processor can operate the program instructions so as to achieve desired functions (which are achieved by the processor) in embodiments of the present disclosure which are mentioned above. Various applications and various data, e.g., various data used and/or generated by the applications and the like, can also be stored in the computer readable storage medium.

Figure 6:
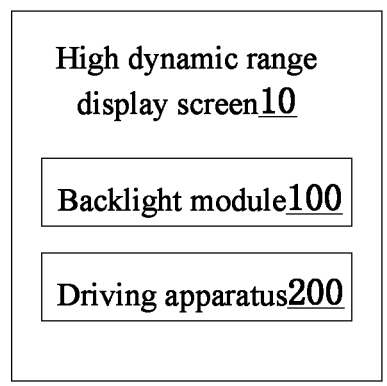
FIG. 6 is a schematic diagram of a high dynamic range display screen provided by an embodiment of the present disclosure.

For example, as shown in FIG. 6, an embodiment of the present disclosure further provides a high dynamic range display screen 10. The high dynamic range display screen 10 includes a backlight module 100 and the driving apparatus 200 provided by any one embodiment of the present disclosure.

Those skilled in the art can understand that the drawings are only schematic diagrams of embodiments, and modules or flows in the drawings are not necessary for implementing the embodiments of the present disclosure.

For example, those skilled in the art can understand that the modules in the apparatus in the embodiments may be distributed in the apparatuses in the embodiments according to description of the embodiments, and may also be correspondingly changed to be positioned in one or more apparatuses different from the embodiments. The modules of the embodiments may be combined into one module, and may also be further split into a plurality of sub-modules.

For example, according to the driving method and the driving apparatus for the high dynamic range display screen, which are provided by embodiments of the present disclosure, after the image data to be displayed is acquired (for example, received), the local backlight brightness of each region in the backlight module is determined according to the brightness of the image data to be displayed, and then the brightness of the image data to be displayed is adjusted according to the local backlight brightness and the maximum backlight brightness in the backlight module, so as to guarantee the minimum brightness value after data compensation is carried out to be relatively low and meet the contrast standard of the HDR display screen. Finally, display is carried out according to the adjusted brightness and the determined local backlight brightness.

Obviously, those skilled in the art may modify the disclosure in various ways without breaking away from the spirits and scope of the disclosure. And so, if these changes and variations of the disclosure also fall within the scope of the claims or their equivalent technologies, the disclosure intends to include these changes and variations.

What are described above is related to the illustrative embodiments of the disclosure only and not limitative to the scope of the disclosure. The scopes of the disclosure are defined by the accompanying claims.

The present application claims the priority of the Chinese Patent Application No. 201610298897.X filed on May 6, 2016, which is incorporated herein by reference in its entirety as part of the disclosure of the present application.

The invention claimed is:

1. A driving method of a high dynamic range display screen, comprising:
    acquiring image data to be displayed;
    determining a local backlight brightness of each region in a backlight module according to the image data to be displayed;
    adjusting pixel brightness corresponding to the image data to be displayed according to the local backlight brightness and a maximum backlight bright in the backlight module; and
    carrying out display according to the adjusted brightness and the determined local backlight brightness of each region;
    wherein the adjusting the brightness of the image data to be displayed according to the local backlight brightness and the maximum backlight brightness in the backlight module comprises:
    determining original pixel brightness according to the image data to be displayed; and
    adjusting the original pixel brightness according to the local backlight brightness and the maximum backlight brightness in the backlight module;
    wherein the adjusting the original pixel brightness according to the local backlight brightness and the maximum backlight brightness in the backlight module comprises:
    adjusting the original pixel brightness by adopting a formula as follows:

$$Y = Y_0 + \frac{(BL_{max} - BL_{DB}) \times Y_0}{BL_{max} \times a},$$

where $Y_0$ is the original pixel brightness, $Y$ is the adjusted pixel brightness, $BL_{max}$ is a maximum backlight brightness in the backlight module, $BL_{DB}$ is the local backlight brightness of the backlight module, and "a" is an adjustable parameter.

2. The driving method according to claim 1, wherein the $BL_{DB}$ is a local backlight brightness of the backlight module after dynamic adjustment.

3. The driving method according to claim 2, wherein a value of the "a" parameter ranges from ⅛ to 1.

4. The driving method according to claim 2, wherein when brightness of a region which corresponds to the image data to be displayed is smaller, the determined local backlight brightness in the backlight module is smaller.

5. The driving method according to claim 1, wherein a value of the "a" parameter ranges from ⅛ to 1.

6. The driving method according to claim 5, wherein when brightness of a region which corresponds to the image data to be displayed is smaller, the determined local backlight brightness in the backlight module is smaller.

7. The driving method according to claim 1, wherein when brightness of a region which corresponds to the image data to be displayed is smaller, the determined local backlight brightness in the backlight module is smaller.

8. A driving apparatus of a high dynamic range display screen, comprising:
- a receiving unit, configured to acquire image data to be displayed;
- a backlight control unit, configured to determine a local backlight brightness of each region in a backlight module according to the image data to be displayed;
- a pixel compensation unit, configured to adjust brightness corresponding to the image data to be displayed according to the local backlight brightness and a maximum backlight brightness in the backlight module; and
- a display control unit, configured to carry out display according to the adjusted brightness and the determined local backlight brightness of each region;
- wherein the pixel compensation unit is configured to:
- determine original pixel brightness according to the image data to be displayed; and
- adjust the original pixel brightness according to the local backlight brightness and the maximum backlight brightness in the backlight module;
- wherein the pixel compensation unit is configured to adjust the original pixel brightness by adopting a formula as follows:

$$Y = Y_0 + \frac{(BL_{max} - BL_{DB}) \times Y_0}{BL_{max} \times a},$$

where $Y_0$ is the original pixel brightness, Y is the adjusted pixel brightness, $BL_{max}$ is the maximum backlight brightness in the backlight module, $BL_{DB}$ is the local backlight brightness of the backlight module, and "a" is an adjustable parameter.

9. The driving apparatus according to claim 8, wherein the $BL_{DB}$ is a local backlight brightness of the backlight module after dynamic adjustment.

10. The driving apparatus according to claim 9, wherein a value of the "a" parameter ranges from ⅛ to 1.

11. A high dynamic range display screen, comprising a backlight module and the driving apparatus according to claim 8.

12. The driving apparatus according to claim 8, wherein when brightness of a region which corresponds to the image data to be displayed is smaller, the determined local backlight brightness in the backlight module is smaller.

\* \* \* \* \*